United States Patent [19]

Stewart, Jr.

[11] Patent Number: 4,923,743

[45] Date of Patent: May 8, 1990

[54] APPARATUS AND METHOD FOR SPRAYING MOVING SUBSTRATES

[75] Inventor: William H. Stewart, Jr., Campobello, S.C.

[73] Assignee: Milliken Research Corporation, Spartanburg, S.C.

[21] Appl. No.: 274,625

[22] Filed: Nov. 22, 1988

Related U.S. Application Data

[63] Continuation of Ser. No. 62,141, Jun. 15, 1987, abandoned.

[51] Int. Cl.$^5$ .............................................. B05D 1/02
[52] U.S. Cl. .................................. 427/288; 427/424; 118/315; 118/325; 118/698; 8/151; 68/205 R
[58] Field of Search ..................... 8/151; 427/424, 288; 118/314, 315, 325, 697, 698; 68/205 R

[56] References Cited

U.S. PATENT DOCUMENTS

| | | | |
|---|---|---|---|
| 1,841,452 | 1/1932 | Ranger | 346/75 |
| 3,278,940 | 10/1966 | Ascolt | 346/75 |
| 3,443,878 | 5/1969 | Weber et al. | 68/183 |
| 3,570,275 | 3/1971 | Weber et al. | 68/205 |
| 3,614,880 | 10/1971 | Bayne et al. | 68/205 R |
| 3,969,779 | 7/1976 | Stewart, Jr. | 8/149 |
| 3,985,006 | 10/1976 | Klein | 68/205 |
| 4,034,584 | 7/1977 | Klein | 68/205 R |
| 4,095,444 | 6/1978 | Pascoe, Sr. et al. | 68/205 |
| 4,501,038 | 2/1985 | Otting | 8/151 |

OTHER PUBLICATIONS

Seng-gye Tombs Curtin and Christopher Hunt, *The Airbrush Book; Art, History and Technique*, Van Nostrand Reinhold Company, N.Y., 1980, pp. 66–72, 142–151.

*Primary Examiner*—Shrive Beck
*Attorney, Agent, or Firm*—George M. Fisher; H. William Petry

[57] ABSTRACT

A method and apparatus for dyeing a substrate using an array of spray generators. In a preferred embodiment, each spray generator is comprised of a gas port from which an intermittent jet of pressurized gas is directed onto the substrate to be dyed. Positioned along the path of the gas jet is a nozzle from which continuously flows a liquid dye. When dyeing is desired, i.e., in response to pattern data, the gas jet is rapidly cycled on and off, thereby atomizing the dye emerging from the nozzle and establishing discrete bursts of spray which meter a controlled quantity of dye onto the substrate. When the gas jet is interrupted, the nozzle projects an interrupted stream of liquid dye which does not contact the substrate.

12 Claims, 9 Drawing Sheets

APPARATUS AND METHOD FOR SPRAYING MOVING SUBSTRATES

This is a continuation of U.S. Pat. No. 062,141 filed June 5, 1987 now abandoned.

The present invention is directed to an apparatus and method for spraying liquids onto a moving substrate. More particularly, the invention disclosed herein relates to an apparatus and method by which a moving substrate may be patterned with a discrete and/or diffuse pattern. It is particularly suitable for the application of dye, ink, or other marking liquids to moving textile materials, such as fabrics, carpets, and the like. As used herein, the term marking liquids shall include, in addition to dyes, inks, and the like, materials which serve to bleach or otherwise modify a previously dyed substrate, as well as materials which, when applied, prevent, retard, or otherwise modify the action of one or more dyes applied subsequently.

It is known to apply liquid dyes to moving substrates, particularly textile materials, from plural streams which are directed onto the materials and selectively controlled to produce a desired pattern thereon. It is also known, in connection with such methods and apparatus, to use a control fluid, commonly air, as the means by which the flow of liquid dye is controlled. While various techniques and approaches for such control have been used, such control fluid methods commonly employ one of several approaches. In a first approach, as taught, for example, in U.S. Pat. Nos. 3,985,006 or 3,969,779 or 4,095,444, a stream of dye is directed at the desired substrate, ad a transverse stream of a control fluid is used to divert the stream into a barrier, catch basin, or the like, in response to externally supplied pattern information or otherwise, when no dye on the substrate is desired. In a second approach, as disclosed, for example, in U.S Pat. Nos. 3,443,878 or 3,570,275, a curtain of dye is directed in closely-spaced, parallel relation to the desired substrate, and one or more streams of a control fluid are directed through the curtain in the direction of the substrate, thereby causing displacement of dye from the curtain onto the substrate. In a third approach, as set forth, for example, in U.S. Pat. No. 4,501,038, a stream of a control fluid such as air is directed into a mixing chamber in which a quantity of dye is introduced in accordance with pattern information. The chamber may be positioned in close proximity to the desired substrate, and may be configured so that, for example, air enters the chamber from the top, intersects a flow of dye entering the chamber from the side, and causes a spray of air and dye to exit from the confines of the chamber, via a conduit extending from the bottom of the chamber, onto the desired substrate.

It is believed that these prior art approaches have inherent operational drawbacks which either affect their commercial utility, limit their general patterning utility, or make them ill suited to generating patterned products of the kind contemplated herein as discussed below.

Such products may be divided into two basic categories. The first may be called a "diffuse pattern" product, in which the desired substrate has been dyed in a pattern which exhibits soft, diffused color boundaries and perhaps exhibits color hues which overlap and blend almost imperceptibly from one to another, and which product may exhibit literally dozens or hundreds of different colors, shades, or hues over the pattern area.

The second category may be called a "random pattern" product, in which the distribution of color within areas on the substrate—or over the entire substrate—has a random or pseudo-random appearance. The color may be in the form of extremely small flecks or specks, or may be in the form of larger areas having irregular, random-appearing borders. Such products often may exhibit characteristics which are a combination of these two categories, wherein, for example, irregularly shaped patches of color exhibit diffused boundaries and contain a multitude of varying shades or hues, and which, optionally, may contain randomly distributed and/or overlapping specks of color in localized areas of the substrate.

It is believed that none of the above prior art approaches can successfully generate such patterned substrates in a controlled, substantially reproducible manner, particularly where, as part of pattern, relatively large areas of substrate are to be dyed in a single shade or in a blend of shades which must exhibit a high degree of uniformity of product (and pattern) appearance, or where extremely small, random specks of color are intended to be generated with a consistent, commercially repeatable visual effect.

It is known, for example, that merely directing a dye stream onto a moving substrate may not result in a uniform, reproducible dyed area, but may tend to produce irregularities at the leading and trailing portions of the dyed area, and will tend to show, in exaggerated form, the effects of any small changes in substrate speed as a highly visible change in the width or character of the line. Similarly, it is believed that achieving the ability to dye small, closely adjacent areas with precision, even if the area boundaries are to appear diffuse, is not merely a matter of mounting prior art components in a more compact format. Problems involving dye stream overlap and interference, dye and control fluid flow and supply, and valve speed and reliability must be overcome. Additionally, any system which depends upon the rapid interruption of the flow of a liquid dye must deal with "water hammer" effects, which can seriously degrade patterning performance and cause damage to the valves and conduits of the apparatus, as well as the problem of preventing the dye from contacting the substrate during "no pattern" intervals and satisfactorily containing such dye.

The present invention is directed to an apparatus and method by which, in a preferred embodiment, several arrays of closely spaced streams of liquid dye or ink are normally directed into corresponding collection troughs; in a preferred embodiment, a diverting surface or lip is used to intercept the streams and channel the liquid dye into the respective collection trough. Each stream in a given array has associated with it a source of pressurized air or other fluid which, on command, forms and directs an atomizing stream or jet of such fluid- on a path which brings the atomizing fluid stream into contact with the liquid dye or ink, whereby the streams of ink or dye are transformed into a mist of variously sized diverging droplets of ink or dye which are propelled, by the combined momentum of the liquid and air streams, in the direction of the substrate to be marked. By interrupting the streams of atomizing fluid in oscillatory fashion, thereby causing the fluid to contact the liquid in bursts of extremely short duration, and by superimposing upon such oscillatory pulsations relatively longer-term patterning instructions which control the number of such pulsations to be executed by each individual atomizing fluid stream in each sequence of oscillations, uniform reproduction of various solid color or multi-hued patterns is possible. By employing such controlled pulsations, as well as by varying the distance over which the resulting spray must travel to reach the substrate and/or adjusting the relative physical position of the diverting surface, the liquid stream and fluid stream sources, and the substrate, it has been found that droplet size distribution and the degree of droplet dispersion can be carefully controlled, yielding intricate patterns possessing great subtlety, delicacy, and variety which may be produced with a high degree of repeatability. By providing for the non-simultaneous actuation of adjacent atomizing fluid streams along a given array, a wide variety of side-to-side or fill direction (i.e., across the width of the substrate web) patterns may be produced. By providing for multiple arrays, multiple color combinations may be employed, or, if preferred, combinations of dye and bleach or dye resist or other dye modifying compositions may be used.

As depicted in the Figures, the invention is particularly well adapted to produce patterns which incorporate the "random effect" discussed above. The invention and its advantages will be better understood following a reading of the description of the preferred embodiment set forth hereinbelow, when read in conjunction with the accompanying Figures, in which:

Figure 1:
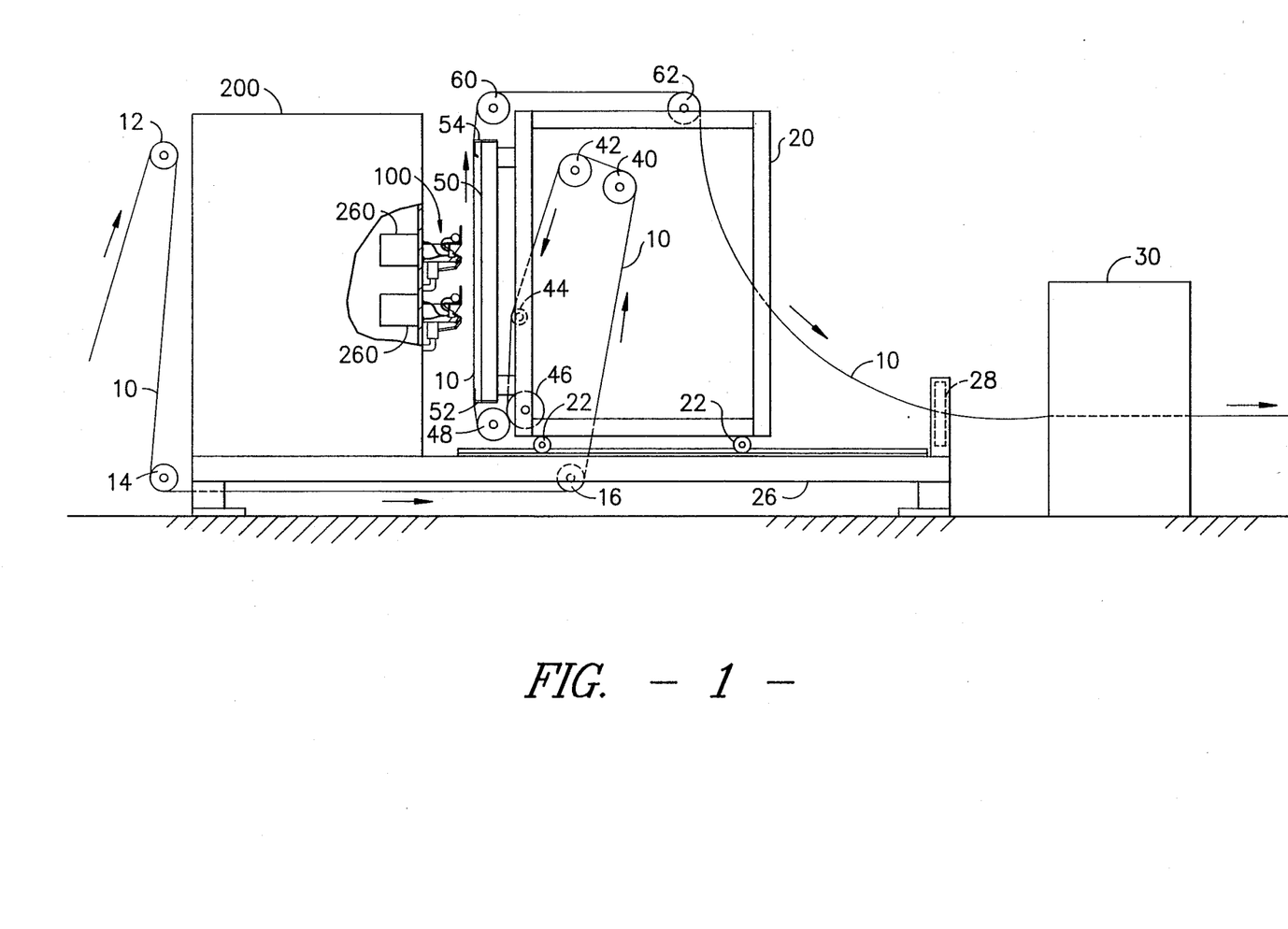
FIG. 1 schematically depicts an elevation view of an apparatus embodying the invention which may be used to pattern a continuous web of substrate.

Referring more specifically to the Figures, FIG. 1 shows, diagrammatically, an overall side elevation-view of apparatus suitable for patterning a web of moving substrate material in accordance with the teachings herein. While any substrate material capable of being dyed or otherwise patterned by the procedures set forth below may be used, a preferred material is a textile substrate such as fabric or carpet in web form; the term fabric shall be used hereinafter without intending to restrict unnecessarily the generality of the discussion hereinbelow. Fabric web 10 is supplied from any suitable source, and is drawn over rolls 12, 14 and under valve house 200 to roll 16, which rotates in bearings associated with platform 26. Substrate 10 is then directed into the interior of rolling frame 20, which is supported on wheels 22 and which may be moved along track 24 to adjust the distance between frame 20 and valve house 200, and, correspondingly, between arrays 100 and the surface of substrate 10. This permits the effects of changing the spacing between arrays 100 and the face of substrate 10 to be easily and immediately observed.

Substrate 10 is directed around rolls 40, 42 and 44 and through driven nip rolls 46, 48 and is then presented, in a preferred embodiment, in a substantially vertical orientation to the multiple arrays 100 of spray generators mounted on the face of valve house 200. As shown in FIG. 1, in a preferred embodiment, the substrate 10 may be separated from an appropriate backing member 50, which may be comprised of plastic or other dye-impervious material, by spacers 52, 54 positioned along the top and bottom edges of backing member 50 above and below the level of the spray generator arrays 100, thereby assuring no contact between the back of substrate 10 and the backing member 50. This prevents unwanted smearing on the back of the fabric and prevents excessive saturation or accumulation of dye visible on the face of the fabric. In a particularly preferred embodiment, lower spacer 52 may be in the form of a trough-like collector which can serve to collect the sprayed liquid which may pass through substrate 10 and collect on backing member 50.

Substrate 10 is then directed over roll 60 and over tension-generating roll 62, which may have a surface covered with rubber or the like and which may be overdriven, to assure that substrate 10 is relatively taut in the region opposite arrays 100. As shown, substrate 10 may then be guided to an appropriate dye fixation means 30 or other post treatment processor.

Figure 2:
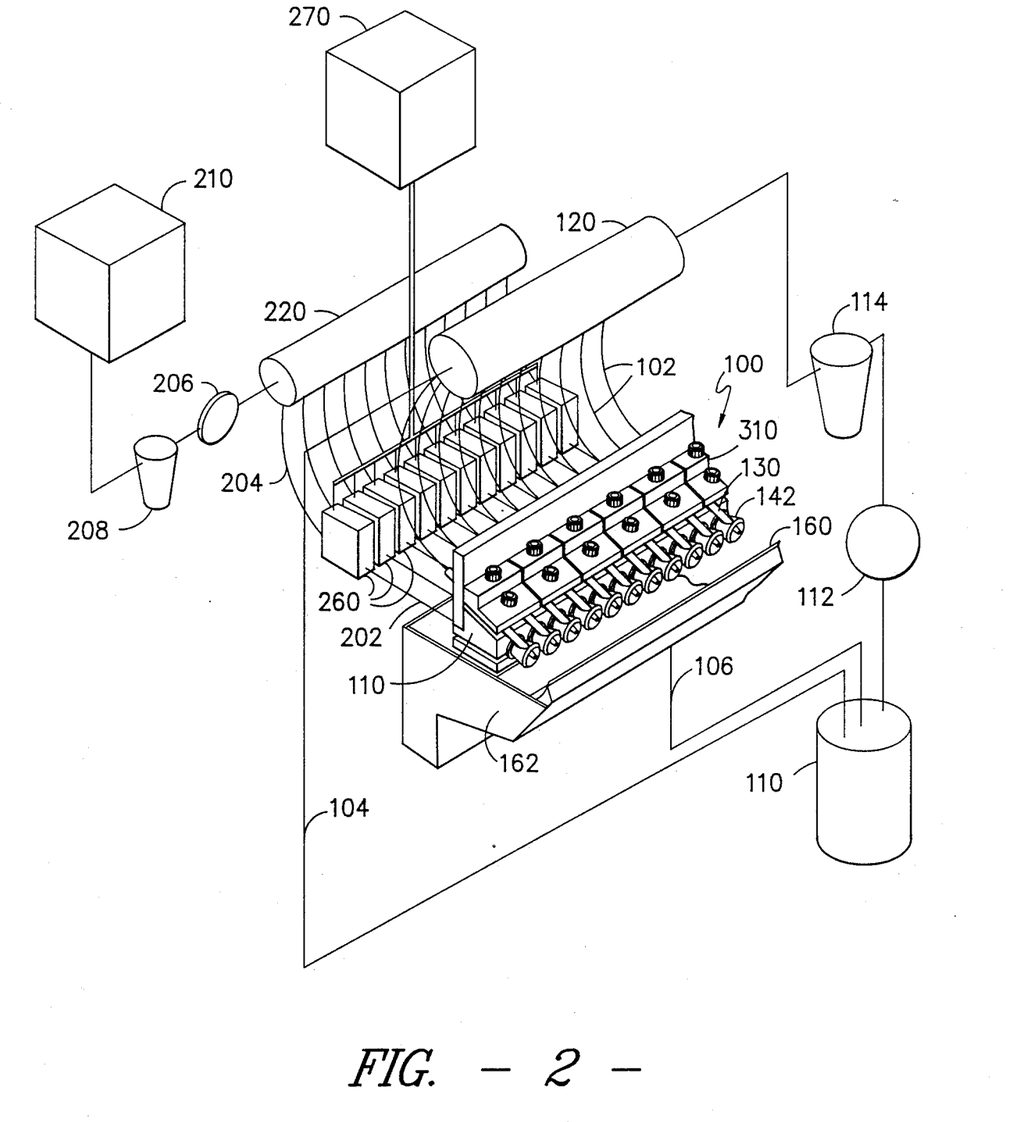
FIG. 2 shows, in schematic form, a spray generator array of the type depicted at 100 in FIG. 1, and the associated dye and air handling apparatus.
Figure 3:
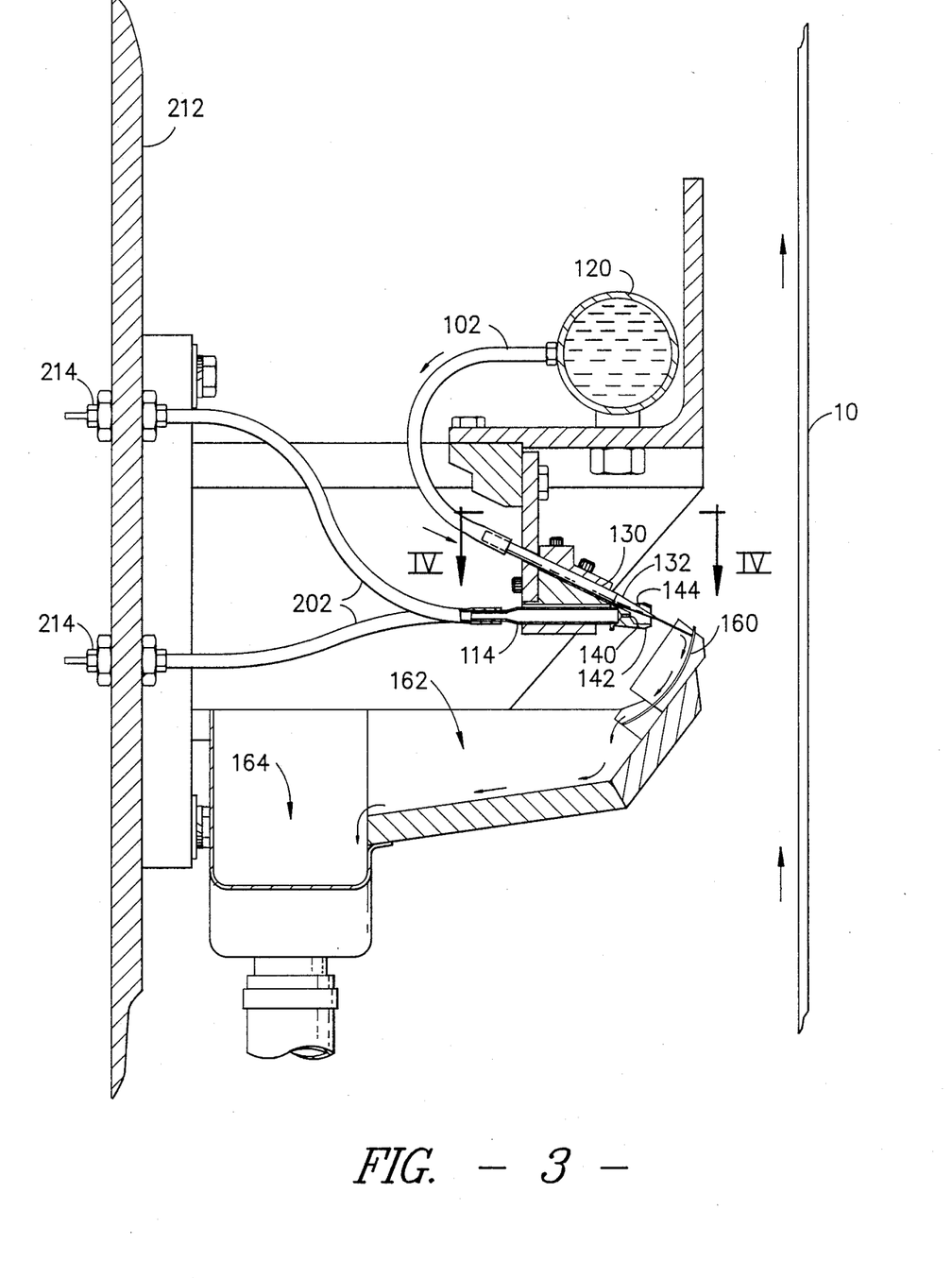
FIG. 3 depicts, in a cross section taken along a vertical plane perpendicular to the longitudinal axis of array 100 and bisecting dye pipe 130, a side view of the spray generator of FIG. 2.

FIGS. 2 and 3 illustrate, in varying degrees of detail, a preferred embodiment of the spray generator of the type depicted at 100 in FIG. 1. FIG. 3 depicts a partial cross-section view along a vertical plane perpendicular to the longitudinal axis of array 100 and through the longitudinal axis of a dye pipe 130 of FIG. 2. The elongate array 100 is comprised of a plurality of individual spray generators, each comprised of a dye pipe 130 and nozzle 132 through which a liquid dye, ink, or other marking material may be pumped, and a dispersing aperture 140 and associated surround 142, through which a relatively high pressure dispersing fluid such as, for example, air or other gas, may be propelled. The individual spray generators are mounted in alignment, with an adjacent spacing appropriate to the degree of definition desired. It is believed adjacent lateral spacings of between about 0.2 inch and 1.0 inch, measured from the centerlines of adjacent dispersing apertures 140 along array 100, may be used with good results. Spacings outside this range may be used if, for example, minimal overlap between adjacent spray patterns on the substrate is desired.

For purposes of discussion hereinafter, dye will be assumed to be the marking material of choice and air will be assumed to be the dispersing fluid of choice, although other marking materials and other gases or fluids may be used for particular purposes.

As depicted in FIG. 2, further associated with each generator is an electronically controlled valve 260 which is interposed in the pressurized air lines 202 and 204 which serve to supply aperture 140 with pressurized air from manifold 220, which in turn is suitably connected, via regulator 206 and filter 208, to a source 210 of pressurized air. Valves 260 are, in a preferred embodiment, of the electrically actuated pneumatic type such as those distributed by the Lee Company of Westport, Connecticut. Associated with each dye pipe 130 is dye supply line 102 which extends from dye manifold 120, which in turn is fed, via pressurizing pump 114 and filter 112 and associated conduits, from dye reservoir 110. Dye conduits 104 and 106 supply reservoir 110 with excess dye from manifold 120 and captured dye expelled by nozzle 132 (FIG. 3) into containment trough 162, thus forming, in a preferred embodiment, a recirculating dye system.

Figure 8:
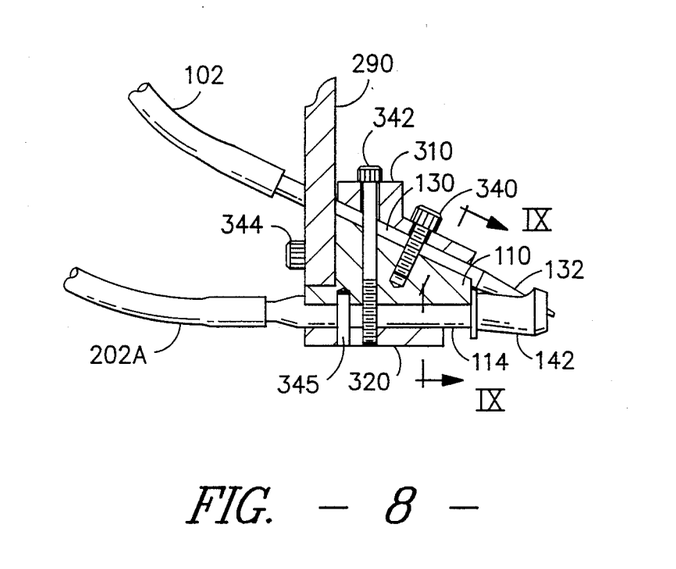
FIG. 8 is a section view, taken along line VIII—VIII of FIG. 7.
Figure 9:
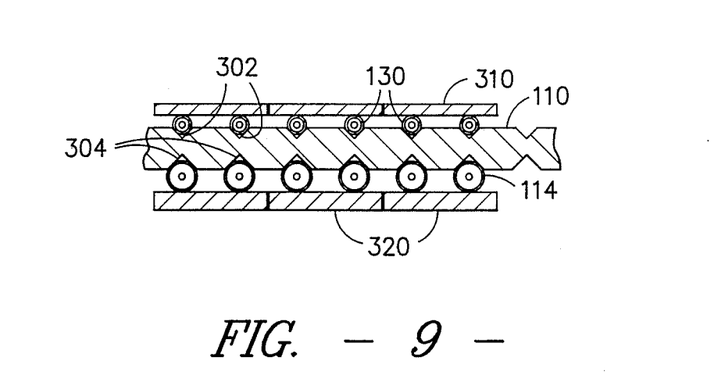
FIG. 9 is a section view taken along line IX—IX of FIG. 8, depicting the "V"-shaped notches useful in aligning the intersecting air and dye streams.

Elongated wedge-shaped array frame 110, as shown in FIGS. 2 and 8, is constructed with a series of parallel "V"-shaped notches or grooves 302, 304, spaced along its length (see FIG. 9) in precisely opposed pairs along the top and bottom of frame 110 at intervals corresponding to the desired spacing between adjacent dye pipes 130 and apertures 140. Air conduits 114 may then be placed within "V"-shaped grooves 304 directly opposite corresponding dye pipes 130, and attached to respective air lines 202. By aligning grooves 302, intended to accommodate dye pipes 130, and corresponding grooves 304, intended to accommodate air conduits 114, the intersecting alignment of the corresponding dye and air streams necessary for maximum dye stream fragmentation may be more easily controlled. Dye pipe positioning plate 310 and air conduit positioning plate 320, secured to frame 110 via laterally spaced bolts 342, maintain dye pipes 130 and air conduits 114 within their respective "V"-shaped grooves. Due to the self-centering nature of the "V"-shaped grooves 302, 304 (as compared with other possible groove cross-section shapes), no additional alignment technique is needed, provided grooves 302 and 304 have been placed directly opposite one another. Alignment pins 345 may be used to insure correct mounting alignment of the positioning plate with respect to frame 110. The array 100, comprising frame 110 and positioning plates 310, 320, is suitable attached, via rigid member 290 and mounting bolts 344, to the front face 212 of valve house 200.

While the angle shown between dye pipes 130 and air conduits 114 is depicted as approximately thirty degrees, this merely represents a preferred embodiment. Angles less than and greater than that shown may be advantageously employed under some conditions, so long as the resulting pressurized dye stream is not sent on a trajectory from nozzle 132 which, in the absence of an interacting burst or stream of gas, results in continuous contact with the substrate.

Air conduit 114 is tapered so that air at pressures of 60 p.s.i.g. or more may be transferred to replaceable port aperture 140 from supply line 202 (of which two are depicted in FIG. 3, merely to indicate a suggested arrangement for closely adjacent lines 202). Supply line 202 is connected to air manifold 220 (FIG. 2) via fittings 214 in front wall 212 of valve house 200. In one embodiment, air valves 260 are situated in close proximity to fittings 214, and may be arranged on a pneumatic circuit board analogous to an electronic circuit board. Such pneumatic circuit board or "valve card" may be equipped with suitable mating fittings so that a valve card, on which have been arranged a plurality of individual air valves for individually controlling a corresponding plurality of individual spray generators, may be merely plugged into corresponding fittings 214 mounted on the inside of front wall 212. In such embodiment, a suitable number of valves 260 as depicted in FIG. 2 may be considered to be individually mounted on one such a valve card with multiple valve cards mounted in adjacent fashion to provide control along the length of the entire array 100.

Associated with aperture 140 is shroud or surround 142, through which nozzle 132 may extend via surround port 144. Surround 142 tends to maintain the high velocity of the dispersing medium jet formed by aperture 140 and to focus the jet in the direction of the substrate. Operation without surround 142 or a similar confining enclosure would result in a process which would generate an undesirable cloud or mist of dye which would be difficult to control in terms of placement, degree of mixing of adjacent sprays, etc.

Figure 5:
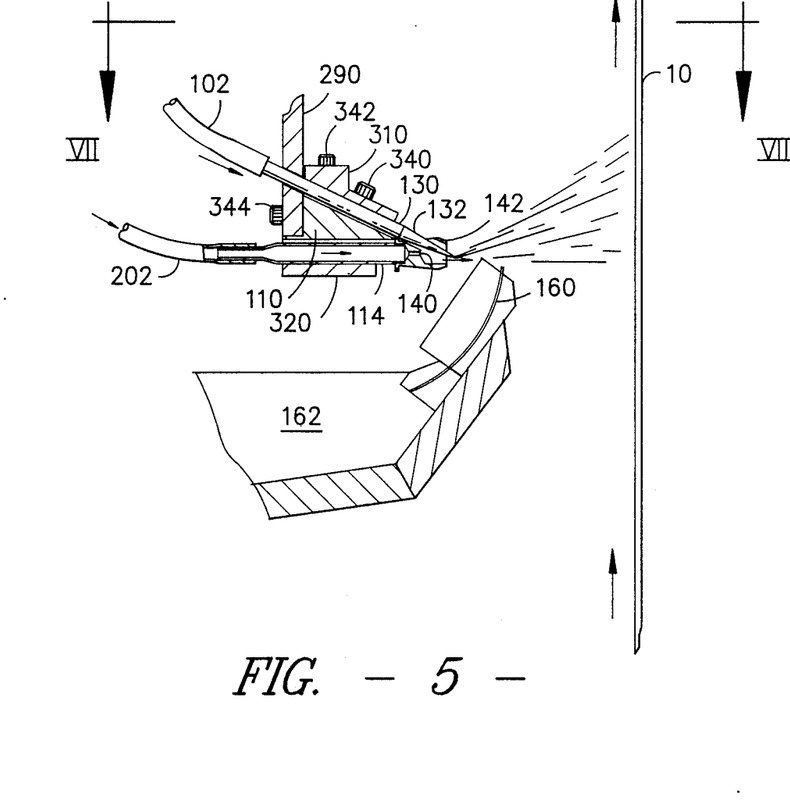
FIG. 5 depicts a section view of a portion of a spray generator illustrating one position of dye nozzle 132 of FIG. 3, as seen along line V—V of FIG. 4
Figure 6:
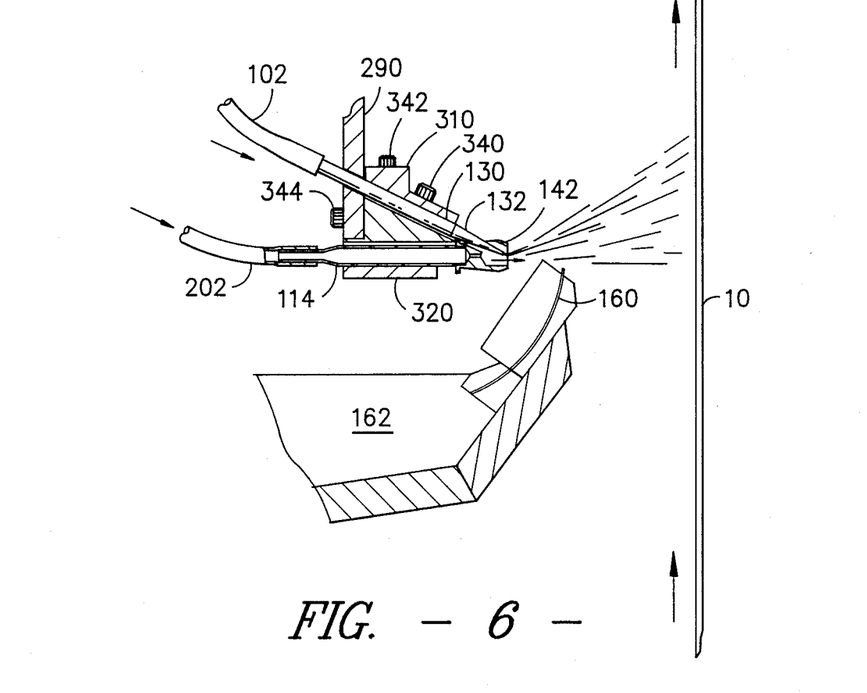
FIG. 6 is a view similar to FIG. 5, showing nozzle 132 in a different position.

Nozzle 132, supplied with slightly pressurized dye via dye supply line 102 and dye supply manifold 120, is associated with pipe 130 which fits within "V"-shaped groove 302 of wedge 110. The relative position of nozzle 132 within surround 142 may be adjusted, as is shown in FIGS. 5 and 6, by moving pipe 130 within groove 302 and locking pipe 130 in the desired position by means of set screw 340. This adjustment has been found to alter the character of the spray by changing the radial distance from the axis of the air jet emerging from aperture 140, and therefore changing the character (e.g., velocity, pressure, etc.) of the region within the air jet at which the dye is ejected from the protected confines of nozzle 132. Although it is contemplated that nozzle 132 may be located substantially above the axis of aperture 140, it is preferred that nozzle 132 be positioned within surround 142. In a particularly preferred embodiment, the tip of nozzle 132 is positioned at most a short radial distance from the axis of aperture 140 so that, whenever the gas stream associated with aperture 140 is actuated, the liquid emanating from nozzle 132 is immediately acted upon by the jet and does not have the opportunity to form a defined, coherent stream except during interruptions in the flow of gas from aperture 140.

Perpendicular to the longitudinal axis of dye nozzle 132 and, in the embodiment shown in the Figures, generally situated opposite aperture 140 and parallel to array 100, is a diverting lip or surface 160. Surface 160 is mounted so that dye exiting from nozzle 132 will, in the absence of a disturbing air stream from aperture 140, form a stream which travels in a trajectory which terminates on diverting surface 160 and flows into an associated containment trough 162. From trough 162, the dye may be pumped, via dye basin 164 and conduit 106, back to dye reservoir 110 for re-use, or may be pumped to a suitable waste receptacle. In the preferred embodiment shown, surface 160 may be mounted inside trough 162 to extend upwardly therefrom, and is preferably mounted via a suitable adjusting means of conventional design so that the degree to which surface 160 extends into or beyond the path of the dye stream, as well as the relative spacing and alignment of the surface 160 with respect to the plurality of nozzles 132 and surrounds 142 in array 100, may be adjusted. It is contemplated that surface 160 may be relatively rigid or may be a relatively thin, flexible blade which is given rigidity by clamping each end of the blade and applying suitable tension along the length of the blade.

In operation, the continuous stream of liquid dye tends to produce some droplets which are substantially larger than the fine mist ordinarily associated with an atomization process such as is employed herein. For purposes herein, the term "microscopic fragmentation" shall be used to describe the process whereby the liquid dye is broken up into a relatively fine mist, i.e., where droplet average diameter is generally substantially smaller than about 0.1 or 0.2 millimeter. The term "macroscopic fragmentation" shall be used to describe the process whereby the liquid dye is broken up into droplets having an average diameter on the order of about 0.1 or 0.2 millimeter, or larger.

It is believed that as the continuous stream of dye is interrupted by the advancing stream of air, the dye stream is atomized in the region of the stream directly in line with the advancing wave front of pressurized air, which results in microscopic fragmentation of the dye. That portion of the dye stream immediately above or below this in-line region remains coherent, but tends to become entrained in the periphery of the passing air stream and tends to separate into relatively large droplets and irregularly shaped spatters of dye (i.e., it undergoes macroscopic fragmentation) which are propelled toward the substrate.

Where the dye stream is squarely impacted by the air stream, microscopic fragmentation takes place, and a relatively fine mist is generated and propelled in the direction of the substrate. In the apparatus configuration shown in the Figures, a portion of such mist usually strikes diverting lip 160 and coalesces there as liquid dye. As the air stream reaches the region of the diverting lip, a portion of the air stream tends to impinge on the inside sur&ace of the lip and tends to push any dye which may be there, either as a result of coalescing mist or of having been the target of the uninterrupted dye stream, away from the area of impingement. Some dye is pushed downwardly into the collection trough 162, but some is pushed upwardly, toward the edge of diverting surface 160, and is ultimately pushed over the edge and is carried by the air stream toward the substrate, in the form of larger droplets and irregularly shaped spatters (i.e., products of macroscopic fragmentation).

Details of the method and operation of the apparatus may be best described with reference to FIGS. 2 through 7.

Figure 4:
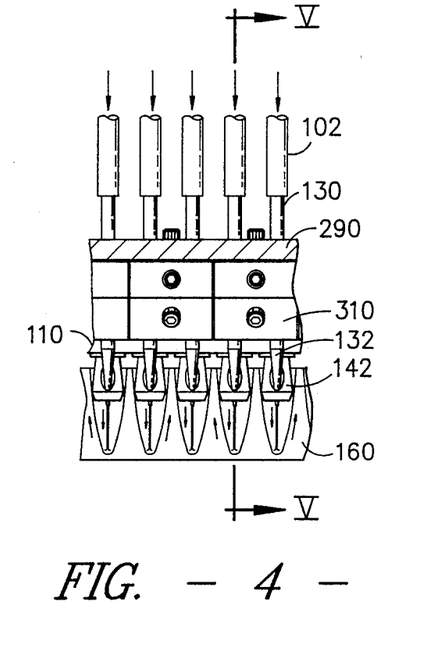
FIG. 4 depicts a plan view of a portion of the array 100 shown in FIG. 2, as seen along line IV—IV of FIG. 3.

Valves 260 associated with air supply lines 202 prevent air from passing through port aperture 140. As a result, ink is permitted to stream from nozzle 132 to diverting surface 160 without interruption as shown in FIGS. 3 and 4, where it is dissipated and collected in containment trough 162 and drip basin 164, and, ultimately, pumped back to dye supply manifold 120 in pressurized form or discarded.

FIGS. 5 and 6 depict the dye applicator in operation where pulses of air, generated by the rapid actuation and deactuation of valves 260, are being supplied to aperture 140. As depicted in FIG. 5, pressurized air entering bore 114 and passing through aperture 140 forms a jet which interacts with the dye which normally flows in a continuous, uninterrupted stream from the tip of nozzle 132 to a location on face of diverting surface 160. In the preferred embodiment shown, the tip of nozzle 132 is positioned within the region occupied by the jet, so that the dye is acted upon immediately as it exits from nozzle 132. This position tends to suppress the formation of the relatively larger spatters, flecks, and blotches associated with macroscopic fragmentation, and tends to encourage the fine mist formation associated with microscopic fragmentation.

As a result of the interaction of the stream of relatively low pressure dye (typically about 0.2 to about 4 p.s.i.g.) with the stream or jet of relatively high pressure air (typically about 5 to about 60 p.s.i.g.) within or in front of surround 142, the stream of dye is dramatically disrupted, and is usually transformed into a shower of diverging droplets. In a preferred embodiment, the ratio of dispersing material pressure to marking material pressure will generally fall within a range of about 5 to about 60, but may fall outside this range under certain conditions. For example, if high viscosity marking materials are used, higher than usual dispersing material pressures may be desirable, causing the above ratio to exceed 60.

A variety of different sized droplets are produced, which are generally propelled in the direction of the surface of moving substrate web 10, which typically may be positioned from about one to about twelve inches from nozzles 132. By varying the respective pressures of the dye and air streams, the viscosity of the dye, the degree to which nozzle 132 protrudes through surround port 144 and intrudes into the air stream or jet flowing from aperture 140, as well as other factors (for example, the degree to which containment lip is made to extend into the area in which the dye spray is generated, the distance between nozzle 132 and diverting surface 160, and the distance between nozzle 132 and substrate 10), a wide variety of visually attractive commercial products may be generated in a reproducible manner.

Figure 7:
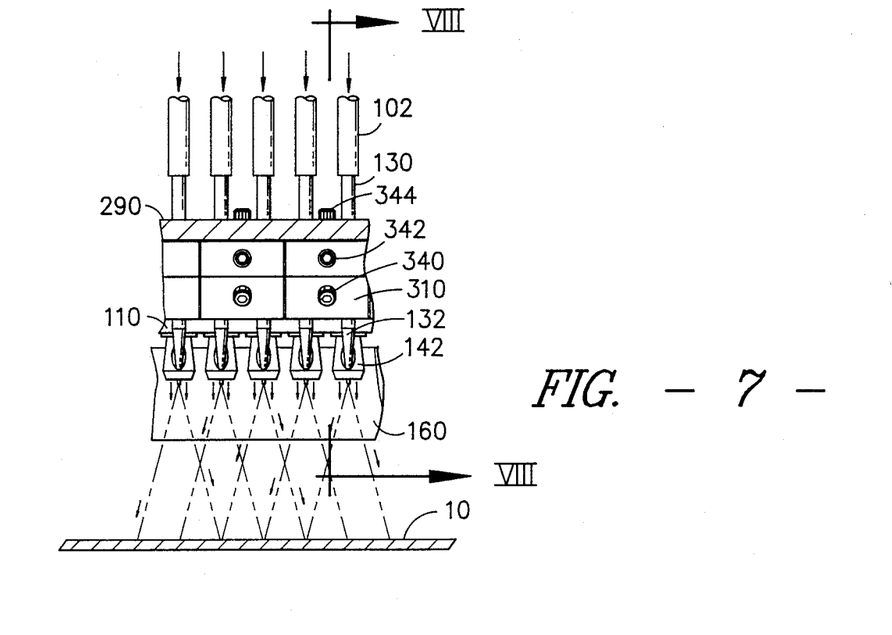
FIG. 7 depicts a portion of the array 100 as seen along lines VII—VII of FIG. 5.

The adjacent spacing of the individual nozzles 132 and apertures 140 comprising the plurality of spray generators spaced along the longitudinal axis of array 100 is generally fixed for a given apparatus in order to maintain proper alignment. This spacing is preferably such that, for a given nozzle-to-substrate distance, the spray patterns from immediately adjacent spray generators have substantially overlapping trajectories, allowing for the overlapping and mixing of the spray patterns throughout a relatively large percentage of the spray path between nozzles 132 and the surface of substrate 10, as depicted in FIG. 7. In a preferred embodiment, the included angle of the spray pattern may be on the order of about 25 to about 50 degrees, the adjacent spacing may be about 0.3 to about 0.6 inch, and the nozzle-to-substrate distance may be from about two to about eight inches; under such conditions, the overlap and mixing of sprays generated not only from immediately adjacent nozzles 132, but from nozzles 132 spaced two or more nozzle spacings away, has been observed. It is believed such substantial mixing and overlapping of the individual spray patterns while the spray droplets are moving toward the substrate contributes greatly to the blending and diffusion which characterizes the "diffuse pattern" product. In a preferred embodiment, the valves 260 controlling the flow of air to aperture 140 are actuated by means of computer control indicated in FIG. 2 at 270, which permits each of the individual dye streams to be selectively interrupted in response to externally supplied pattern data, thereby providing the capability of reproducing complex patterns. Computer control may also be used to accommodate variations in dye pick-up or dye deposition requirements among different types of substrates, as well as variations in the speed of the substrate as it is drawn through the apparatus. This may be achieved in a manner similar to that disclosed in U.S. Pat. Nos. 3,894,413; 3,969,779; or 4,033,154.

As set forth therein, a rotary motion digital encoder, not shown in the Figures herein, is associated with the movement of the substrate through frame 20. This provides a signal corresponding to the linear travel of the substrate 10, which may then be used to meter a predetermined quantity of dye onto a fixed length or area of substrate in a repeatable manner.

For purposes of discussion, a cycle time T may be defined as that period of time which corresponds to the time necessary for the substrate to travel some small distance representing the limit of pattern detail desired in the direction of substrate travel, e.g., 0.1 inch. For a substrate speed of sixty inches per minute, 0.1 inch of substrate travel corresponds to 100 milliseconds. Therefore, in the case where 0.1 inch is chosen as the minimum level of pattern detail desired along the length of the web, and where the web speed is five feet per minute, the cycle time T will be set at 100 milliseconds. This cycle time T not only represents the time interval necessary for the web to advance 0.1 inch, but also represents the time interval between the initiation of one burst of air (and, therefore, spray of dye) and the initiation of the next burst of air. The desired duration of each burst of air within each 100 millisecond cycle, and therefore the duration of the dye spray directed at the substrate, may be determined by considering the amount of dye pickup or dye deposition requirements dictated by the nature of the dye and substrate used. The role of the patterning data, which may be supplied via magnetic disc or other means, is to specify, by pattern command, the requisite number of individual 100 millisecond cycles in which the air supply for each of the spray generators will be actuated in order to form the necessary groups of dye droplet needed to generate the required pattern or cover the proper area of substrate with the proper quantity of dye. The overall effect is the generation of a series of spaced groups of discrete droplet sprays or clouds emanating from each spray generator, wherein the individual cloud size and spacing between cloud groups is determined by the pattern data, the nature of the dye and substrate, etc. By adapting this single-spray-per-cycle/multiple-cycles-per-pattern-command approach, variations in substrate speed may be completely ignored, because the dye is being metered onto the substrate in response -o actual web movement, and not in response to an assumed substrate web speed or the passage of an arbitrary time interval. In the example above, assume dye pickup requirements require that dye be applied for 20 milliseconds out of each 100 millisecond cycle. Therefore, the air supply associated with each spray generator along array 100 needed for patterning at that time may be switched on for 20 milliseconds then switched off for 80 milliseconds, then switched on for 20 milliseconds, etc., thereby forming bursts of spray droplets of a uniform size (i.e., that size generated by a 20 millisecond burst of air) at 100 millisecond intervals, until the number of on/off cycles dictated by the pattern data for that specific spray generator has occurred. If the substrate is now slowed to half its former speed, the time taken for the web to advance 0.1 inch is now doubled, therefore doubling cycle time T. The "dwell time" of the substrate in front of the spray generators is now twice its former value. However, the rate at which dye is applied by the individual spray generators when the air supply is switched on is constant. If the same quantity of dye is to be applied within the 0.1 inch expanse of substrate as before, the elapsed time the air supply is on remains at its previously determined level, i.e., 20 milliseconds; the off time, however, must be extended to provide for an overall cycle time equal to the new time taken for the substrate to advance 0.1 inch. In this example, therefore, slowing the substrate speed to half its former value will cause the aforementioned computer control to generate bursts of spray droplets of the same size as before, but at 200 millisecond intervals.

By constantly monitoring the inevitable small variations in web travel, and by using such variations to modify slightly by the air supply "off" time, high standards of product and pattern uniformity may be achieved. Due to certain restrictions relating to valve response time, etc., it is recommended that the speed of the web is not increased (thereby also decreasing the "off" time) to the point where the "off" time is so brief that the valve controlling the flow of air cannot be switched from "on" to "off" and back to "on" within the allotted cycle time.

Dyes or other marking materials having a wide variety of flow characteristics have been used; generally speaking, higher viscosity liquids tend to increase the degree of macroscopic fragmentation which occurs, while lower viscosity liquids tend to increase the degree of observed microscopic fragmentation. Various thickeners, thixotropic agents, surface tension modifiers, and the like have been used with interesting results. For example, use of agents such as guar gum which cause the liquid dye to become "stringy" causes the resulting pattern of dye on the substrate to contain a random line segment pattern element which somewhat resembles portions of a spider web, and which contains blobs or irregularly shaped nodes of dye positioned at various intervals along the length of the line segments.

The process and apparatus disclosed herein has been used to pattern or color a variety of commercially available textile substrates, and has resulted in many visually distinctive effects. The following illustrative examples are intended to be representative only, and are not intended to be limiting in any way.

EXAMPLE 1

A 100% polyester knit fabric having 16 wales per inch and 34 courses per inch and a weight of approximately 1.36 pounds per linear yard (59.2 inch width) was backcoated with an SBR latex adhesive and dried. The fabric was heatset, jet dyed, and again backcoated. The face of the fabric was then brushed. H The resulting fabric web was then treated using an apparatus similar to that depicted in FIGS. 1 and 2, at a fabric speed of 6 yards per minute. Nozzle 132 was adjusted within surround 142 generally as shown in FIG. 6. Three different dyes were used during the single treatment "run." The dye liquor was made by adding Kelzan gum (available from Kelco Corp, of San Diego, Calif.) to a dye liquor containing disperse dye to adjust the viscosity to about 550 centipoise. Acetic acid was added to produce a pH of about 4.5, and an antifoam agent was added.

A rotary motion digital encoder, associated with one of the primary transport rolls in frame 20, produced a signal to the control computer 270 at each 0.4 inch of linear movement of the fabric web. Dye liquor flow to each of the nozzles 132 was about 30 grams per minute; each nozzle, laterally spaced along the array at 0.4 inch intervals, had an interior tip diameter of 0.020 inch. The central computer 270, at each encoder signal, fired a burst of air at 35 p.s.i.g. through appropriate apertures 140 for a period of 10 milliseconds. The pattern selected produced a series of offset, overlapping lines forming a diamond pattern.

Frame 20 was moved periodically during the "run" to provide an array-to-fabric spacing which varied from about one inch to about ten inches. The resulting patterns are shown in FIGS. 10 through 14, and result from respective spacings of approximately one inch, three inches, five inches, seven inches, and ten inches. The resulting patterned fabric was heatset to dry and fix the dyes.

Figure 10:
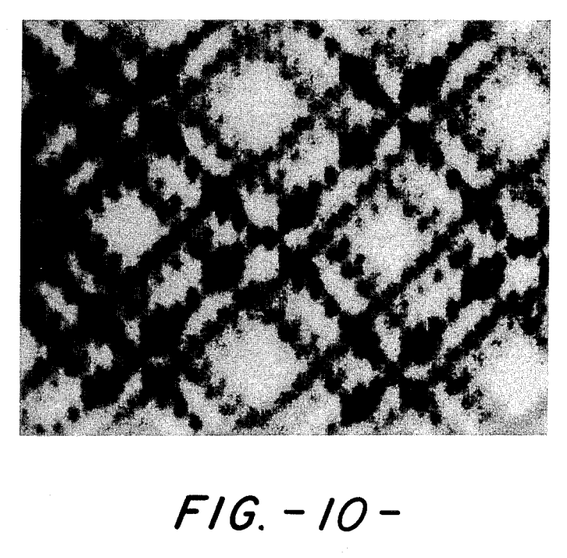
FIGS. 10 through 14 are photomicrograph (0.2X) showing the face of the patterned knitted fabric of Example 1.
Figure 11:
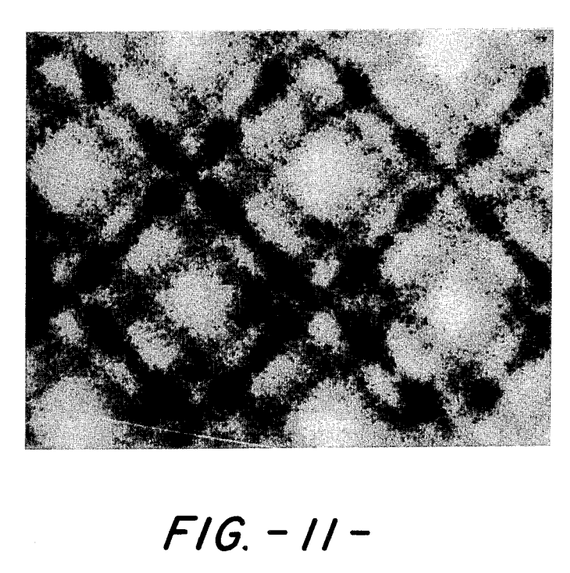
Figure 12:
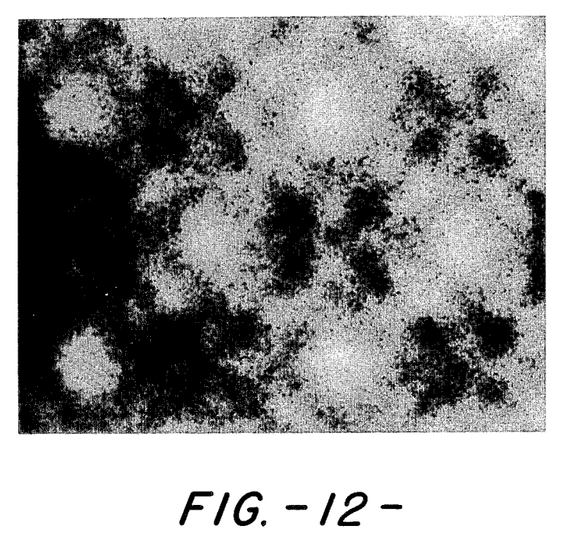
Figure 13:
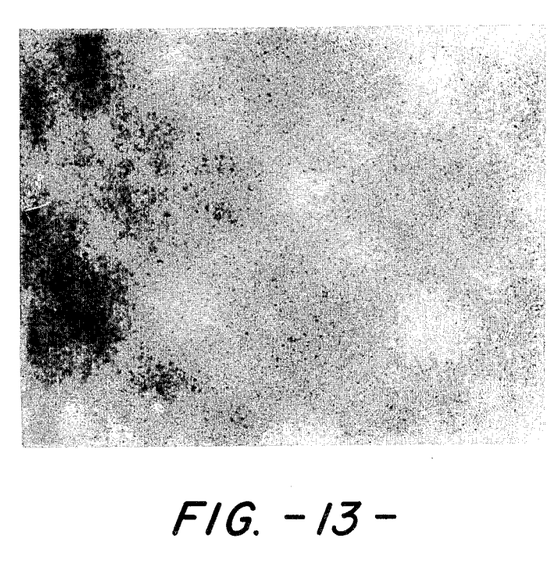
Figure 14:
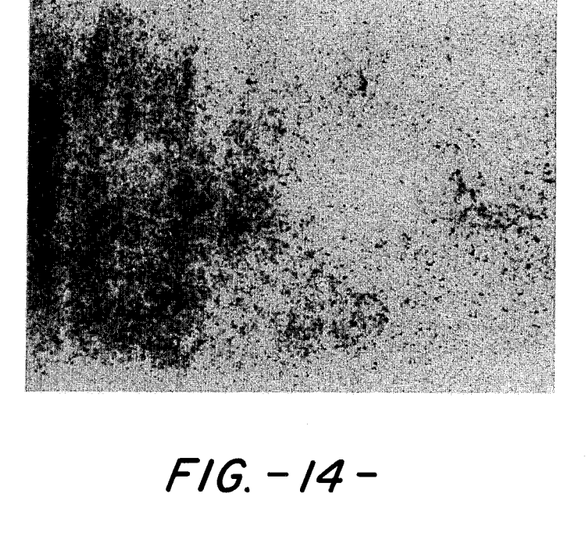

As may be seen, the distinct-yet-somewhat "fuzzy" pattern of FIG. 10 becomes progressively more highly diffused in Figures 11 and 12, until it is quite nebulous in FIG. 13 and almost indiscernible in FIG. 14. In each of the Figures, however, the small spatters or specks resulting from macroscopic fragmentation are apparent and become increasingly more uniformly distributed over the fabric surface as the array-to-fabric distance increases.

EXAMPLE 2

Figure 15:
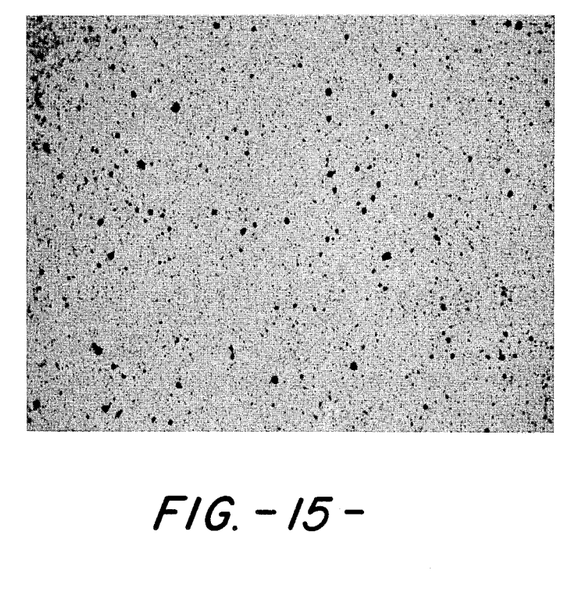
FIG. 15 is a photomicrograph (1.1x) showing the face of the patterned woven fabric of Example 2.

A 100% polyester flat woven fabric having a finished construction of 98 warp and 53 fill yarns and a finished weight of about 7.75 ounces per linear yard (56 inch width) was scoured, jet dyed as prepare-for-print fabric, and heatset. The fabric was treated as in Example 1, except a single, dark blue dye was used, and the array-to-fabric spacing was set at eleven inches. The resulting fabric was heated to dry and fix the dye, and is shown in the photograph of FIG. 15. The dye stream, subject to macroscopic fragmentation, produced a random-appearing pattern of irregularly shaped and sized specks, dots, or blobs on the fabric.

It is contemplated that the processes of Examples 1 and 2 could be carried out using multiple colors, either during the initial process, or in subsequent repetitions of the process using the same fabric.

It is further contemplated that other fabric constructions and face treatments (e.g., napped fabrics, pile fabrics, non-woven fabrics, et.) may be advantageously treated using the instant invention.

I claim:

1. A method for dyeing a web of sheet material wherein said web is positioned in the path of a marking spray, said spray being formed by the interaction of a pressurized stream of liquid marking material and a stream of a pressurized gaseous dispersing agent, said method comprising the steps of projecting a plurality of discrete, substantially continuous liquid streams of a marking material along a path which precludes contact with said web, forming at least one pressurized dispersing stream of a gaseous dispersing agent, said dispersing stream being projected in an expanding trajectory directed at said web and being oriented to provide for the intersection of said dispersing stream with at least one respective liquid marking stream, said dispersing stream having sufficient lateral width at the location of said intersection with said at least one liquid marking stream to envelope laterally said liquid marking stream at said location, and having sufficient maximum pressure to form from said laterally enveloped respective stream of marking material a shower of diverging droplets of said marking material and to project at least a portion of said diverging droplets onto said web, said pressure associated with said dispersing stream being rapidly modulated so as to form from said continuous stream a series of spaced discrete bursts of droplets directed at said web, each burst containing a controlled quantity of marking material, and thereby meter a controllable quantity of marking material onto said web at a rate determined by the frequency and duration of said bursts, and moving said web on a path which brings at least a portion of said web into contact with said droplets.

2. The method of claim 1 wherein said series of spaced discrete bursts of droplets is interrupted at intervals in accordance with pattern information.

3. A method for dyeing a web of sheet material wherein said web is positioned in the path of a moving spray, said spray being formed by the intersection of a pressurized liquid stream of marking material and a stream of a pressurized gaseous dispersing agent, said method comprising the steps of projecting a plurality of discrete, substantially continuous, liquid streams of a marking material along respective trajectories which intersect a deflecting surface positioned adjacent to said web which prevents said streams from contacting said web, forming at least one pressurized dispersing stream of a gaseous dispersing agent, said dispersing stream being directed on a path which provides for impingement of a portion of said stream on said web and a portion of said stream on said deflecting surface, said stream being generally aligned with a respective one of said streams of marking liquid to provide for the intersection and lateral envelopment of said liquid marking stream by said gaseous dispersing stream, said gaseous dispersing stream having sufficient maximum pressure to form from said liquid stream of marking material a shower of droplets of marking material and to project at least a portion of said shower of droplets onto said web, said pressure associated with said dispersing stream being varied in a periodic manner to cause macroscopic fragmentation of a portion of said liquid stream, as well as causing macroscopic fragmentation of a portion of said liquid marking material contacting said deflecting surface, in addition to causing microscopic fragmentation of a portion of said liquid stream, thereby forming a shower of liquid droplets comprising a relatively fine mist as a result of said microscopic fragmentation as well as a relatively coarse spray as a result of said microscopic fragmentation, and moving said web on a path which brings at least a portion of said web into contact with at least a portion of said shower of droplets.

4. The method of claim 3 wherein said periodic pressure variations comprise complete interruptions of said dispersing stream, thereby forming bursts of droplets directed at said web, each burst containing a controlled quantity of liquid marking material, and thereby metering a controllable quantity of marking material into said web at a rate determined by the frequency and duration of said bursts.

5. The method of claim 4 wherein said liquid stream is substantially entirely atomized by said dispersing stream, thereby precluding the flow of said liquid stream along any part of said trajectory except during said interruptions of said dispersing stream.

6. An apparatus for spraying a liquid marking material onto the surface of a moving web by dividing a pressurized stream of said marking material into droplets via an impinging stream of pressurized gas directed at said surface, said apparatus comprising:

(a) spray applicator means comprising a nozzle for discharging at least one discrete stream of said marking material along a trajectory which avoids said web surface, and a gas discharge port, directed at said web, said nozzle and said port being respectively associated with a supply of liquid marking material and pressurized gas, said port and said nozzle being dimensioned and oriented to produce respective streams which intersect wherein, in the region of intersection, said stream of pressurized gas laterally envelopes said stream of liquid marking material and produces a finely divided spray of said marking material;

(b) gas valve means interposed between said nozzle and said gas supply, said valve means being capable of alternately initiating and restricting the flow of gas to said nozzle in a cyclic manner independent of externally supplied pattern information; and (c) transport means for moving said web on a path in which said spray of marking material contacts said web.

7. The apparatus of claim 6 wherein said gas valve means is associated with a source of pattern information which generates signals which interrupt the cyclic operation of said valve means.

8. An apparatus for spraying a liquid marking material onto the surface of a moving substrate by fragmenting said marking material into droplets via an impinging stream of pressurized gas directed at said surface, said apparatus comprising:

(a) spray applicator means comprising a nozzle for discharging a pressurized stream of said marking material along a trajectory, and a gas discharge port, directed at said substrate, said nozzle and said port being respectively associated with a supply of liquid marking material and pressurized gas, said port and said nozzle being dimensioned and oriented to produce respective streams which intersect wherein, in the region of intersection, said stream of pressurized gas laterally envelopes said stream of liquid marking material and produces a finely divided spray of said marking material;

(b) gas valve means interposed between said nozzle and said gas supply, said valve means being capable of controlling the flow of gas to said nozzle in a cyclic manner;

(c) diverting surface means, positioned adjacent to said substrate and along said trajectory of said marking material, for terminating said trajectory and diverting said liquid stream into a collection means;

(d) collection means associated with said deflecting surface means for collecting liquid deflected by said deflecting surface means; and (e) transport means for moving said substrate on a path in which at least a portion of said spray of marking material contacts said substrate.

9. The apparatus of claim 8 which further comprises pattern control means associated with said gas valve means for actuating and deactuating said valve means, and thereby controlling said flow of gas to said nozzle. quantity of marking material onto said web at a rate determined by the frequency and duration of said bursts.

10. An apparatus for spraying a liquid marking material onto the surface of a moving substrate by fragmenting said marking material into droplets via an impinging stream of pressurized gas directed at said surface, said apparatus comprising:

(a) spray applicator means comprising a nozzle for discharging a stream of said marking material along a trajectory, and a gas discharge port, for intermittently discharging a stream of pressurized gas directed at said substrate, said nozzle and said port being respectively associated with a supply of pressurized marking material and pressurized gas, said nozzle being positioned within the path of said pressurized gas stream to produce a finely divided spray of marking material upon discharge of said pressurized gas stream from said port;

(b) shroud means axially surrounding said gas discharge port for shaping the stream f pressurized gas emanating from said port;

(c) gas valve means interposed between said nozzle and said gas supply, said valve means being capable of controlling the flow of gas to said nozzle in a cyclic manner;

(d) diverting surface means, positioned adjacent to said substrate and along said trajectory of said marking material, for terminating said trajectory and diverting said liquid stream into a collection means;

(e) collection means associated with said deflecting surface means for collecting liquid deflected by said deflecting surface means; and (f) transport means for moving said substrate on a path in which at least a portion of said spray of marking material contacts said substrate.

11. The apparatus of claim 10 which further comprises pattern control means associated with said gas valve means for actuating and deactuating said valve means, and thereby controlling said flow of gas to said nozzle.

12. The apparatus of claim 10 wherein said nozzle is positioned within said shroud in close proximity to the axis of said port.

* * * * *

UNITED STATES PATENT AND TRADEMARK OFFICE
CERTIFICATE OF CORRECTION

PATENT NO. : 4,923,743

DATED : May 8, 1990

INVENTOR(S) : William H. Stewart, Jr.

It is certified that error appears in the above-identified patent and that said Letters Patent is hereby corrected as shown below:

Col. 12,
Claim 3, Line 44 and 45, cancel "microscopic", substitute --macroscopic--.

Col. 13,
Claim 6, Line 11, Cancel "nozzle", substitute --port--

Col. 13,
Claim 6, Line 14, cancel "nozzle", substitute --port--

Col. 13,
Claim 8, Line 40, cancel "nozzle", substitute --port--

Col. 13,
Claim 8, Line 42, cancel "nozzle", substitute --port--

Col. 14,
Claim 9, Line 7, cancel "nozzle", substitute --port--

Col. 14,
Claim 10, Line 28, cancel "f", substitute --of--

Col. 14,
Claim 10, Line 30, cancel "nozzle", substitute --port--

Col. 14,
Claim 10, Line 32, cancel "nozzle", substitute --port--

Col. 14,
Claim 11, Line 49, cancel "nozzle", substitute --port--

Col. 14, lines 8-10, delete "quantity of marking..........bursts"

Signed and Sealed this

Eighth Day of February, 1994

Attest:

BRUCE LEHMAN

Attesting Officer    Commissioner of Patents and Trademarks